(12) United States Patent
Miranda et al.

(10) Patent No.: US 9,980,865 B2
(45) Date of Patent: May 29, 2018

(54) ELEVATING WHEELCHAIR

(71) Applicants: Christopher Miranda, Phoenix, AZ (US); Peter Thomas Georgiou, Scottsdale, AZ (US); Rachel Bone, Glendale, AZ (US); Yen-ting Lai, Kaohsiung (TW)

(72) Inventors: Christopher Miranda, Phoenix, AZ (US); Peter Thomas Georgiou, Scottsdale, AZ (US); Rachel Bone, Glendale, AZ (US); Yen-ting Lai, Kaohsiung (TW)

(73) Assignee: Christopher Miranda

( * ) Notice: Subject to any disclaimer, the term of this patent is extended or adjusted under 35 U.S.C. 154(b) by 0 days. days.

(21) Appl. No.: 14/673,701

(22) Filed: Mar. 30, 2015

(65) Prior Publication Data

US 2016/0287457 A1 Oct. 6, 2016

(51) Int. Cl.
| | | |
|---|---|---|
| A61G 5/10 | (2006.01) | |
| B60N 2/16 | (2006.01) | |
| A47C 3/30 | (2006.01) | |
| B60N 2/68 | (2006.01) | |
| A47C 3/20 | (2006.01) | |

(52) U.S. Cl.
CPC .............. *A61G 5/1059* (2013.01); *A47C 3/20* (2013.01); *A47C 3/30* (2013.01); *B60N 2/16* (2013.01); *B60N 2/686* (2013.01)

(58) Field of Classification Search
CPC ...... A61G 5/1059; A61G 5/1056; A61G 5/10; A47C 3/20; A47C 3/30; B60N 2/16; B60N 2/686

USPC .................................. 280/250.1; 297/452.55
See application file for complete search history.

(56) References Cited

U.S. PATENT DOCUMENTS

| | | | | | |
|---|---|---|---|---|---|
| 2,698,047 | A | * | 12/1954 | Ralston | .................... A47C 1/06 297/344.15 |
| 5,137,102 | A | * | 8/1992 | Houston, Sr. | .......... A61G 5/042 180/65.51 |
| 5,435,404 | A | * | 7/1995 | Garin, III | ................ A61G 5/043 180/6.5 |
| 6,397,761 | B1 | * | 6/2002 | Moore | ....................... A47B 9/10 108/147 |
| 8,028,359 | B2 | * | 10/2011 | Parson | ................... A61G 5/006 5/610 |
| 8,336,133 | B2 | * | 12/2012 | Palay | ....................... A61G 5/14 5/81.1 R |
| 8,955,871 | B2 | * | 2/2015 | Takamoto | ................ A61G 5/14 280/657 |
| 2004/0051279 | A1 | * | 3/2004 | Grant | ................... A61G 5/1059 280/638 |
| 2007/0278761 | A1 | * | 12/2007 | Firth | ....................... A61G 5/14 280/250.1 |
| 2008/0133089 | A1 | * | 6/2008 | Bayomy | .............. A61G 5/1059 701/49 |

(Continued)

*Primary Examiner* — Joseph Rocca
*Assistant Examiner* — Michael Stabley
(74) *Attorney, Agent, or Firm* — Snell & Wilmer L.L.P.; J. Damon Ashcraft

(57) ABSTRACT

An elevating wheelchair is disclosed. The wheelchair may have a gas cylinder disposed between the seat of the wheelchair and the frame of the wheelchair. By engaging the gas cylinder and pressing against an assistive push bar, the user may translate the seat along at least a portion of a seat travel path, elevating the seat of the wheelchair.

17 Claims, 6 Drawing Sheets

(56) References Cited

U.S. PATENT DOCUMENTS

| | | | |
|---|---|---|---|
| 2010/0154116 A1* | 6/2010 | Fan .................... | A61G 5/1059 5/86.1 |
| 2011/0316253 A1* | 12/2011 | Tuckowski ............ | A61G 5/045 280/304.1 |
| 2012/0133113 A1* | 5/2012 | Takamoto ............... | A61G 5/14 280/657 |
| 2012/0205953 A1* | 8/2012 | Bruestle ................ | A61G 5/104 297/344.12 |

* cited by examiner

ELEVATING WHEELCHAIR

TECHNICAL FIELD

The present disclosure relates to wheelchairs, and in particular to wheelchairs that elevate.

BACKGROUND

Wheelchairs have long been used, for example, in order to improve quality of life for people with disabilities. However, wheelchairs often position the users' hands and head at a lower level above ground than does standing. Users of prior wheelchairs typically experience difficulty reaching high objects and challenges engaging in social interaction, for example, difficulty catching and maintaining eye contact from others. Thus, there is a need for a wheelchair that does not have the problem of reduced user height.

Prior attempts to address these problems include standing wheelchairs that increase the user's height. However, these chairs are often complex, expensive, and difficult to operate.

For example, these wheelchairs elevate their user by pivoting the seat of the wheelchair at the user's knees and waist, making the user stand. This process is done manually as the user lifts the chair by moving a set of levers that are on both sides of the wheelchair. This lifting method requires that the user adjust their hands in order to continue elevating the chair. In order to allow the user to adjust their hands, the levers often have multiple grip points for the user to grasp when performing the elevation process. This process also requires that the user manually pivot their seat as well as their body, and they do so using levers placed on both sides of the chair. Using these levers often involves multiple steps and requires that the user reach their arms backwards to grab the lever and bring it forward, adjusting their hands, often repeatedly, as they elevate. This complex, multi-step process is often difficult for users and may take 5-10 seconds or longer to complete.

Furthermore, this prior approach adds many parts to the wheelchair's construction including hinges, bolts, levers, and straps. These additional parts increase the weight of the wheelchair, and can be expensive. These additional parts weigh down the wheelchair and add additional cost to the chair. These additional parts also give more chances for part failure.

Accordingly, improved systems and methods for elevating wheelchairs are desirable.

SUMMARY

An elevating wheelchair is disclosed. The elevating wheelchair may include a wheelchair frame, a cylinder stabilization plate mechanically attached to the wheelchair frame, a gas cylinder disposed within a cylinder outer casing attached to the cylinder stabilization plate, and a cylinder lifting arm configured to be at least one of extended and retracted by the gas cylinder.

An elevating wheelchair is disclosed. The elevating wheelchair may include a wheelchair frame, a cylinder stabilization plate mechanically attached to the wheelchair frame and a cylinder outer casing, and an assistive push bar mechanically attached to the wheelchair frame and including a push bar articulator having a hinge whereby the assistive push bar may be repositioned. The elevating wheelchair may further include an engaging system having an engagement interface disposed on the assistive push bar and controllable by a user whereby a gas cylinder may be actuated, and a seat configured to be at least of raised and lowered by the gas cylinder along a seat travel path.

A method for elevating a seat of a wheelchair is disclosed. The method may include engaging a gas cylinder mechanically disposed between the seat of the wheelchair and a frame of the wheelchair and positioned to elevate the seat when engaged. The method may further include pressing against an assistive push bar wherein the assistive push bar is in substantially fixed mechanical communication with the frame of the wheelchair, wherein said assistive push bar is positioned to aid the gas cylinder in elevating the seat. Finally, the method may include disengaging the gas cylinder when the seat of the wheelchair reaches a desired elevation.

BRIEF DESCRIPTION OF THE DRAWINGS

With reference to the following description, appended claims, and accompanying drawings as attached:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of principles of the present disclosure.

For the sake of brevity, conventional techniques for wheelchair design, computer modeling, manufacturing, electronic control, biomechanical activation, and/or well-known physical and mathematical relationships may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical elevating wheelchair system.

Figure 1:
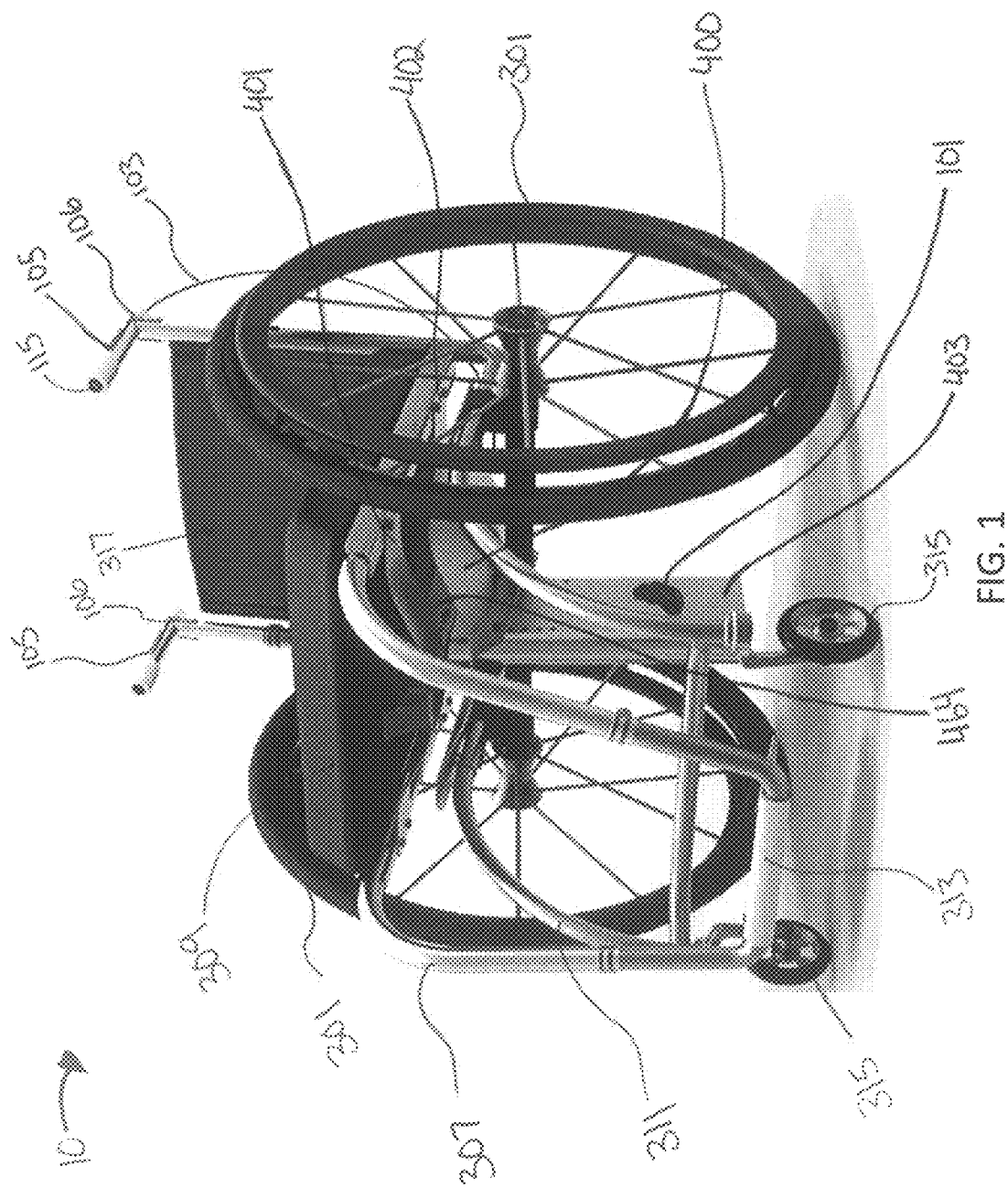
FIG. 1 illustrates various aspects of an exemplary elevating wheelchair in a lowered position in accordance with various embodiments.
Figure 2:
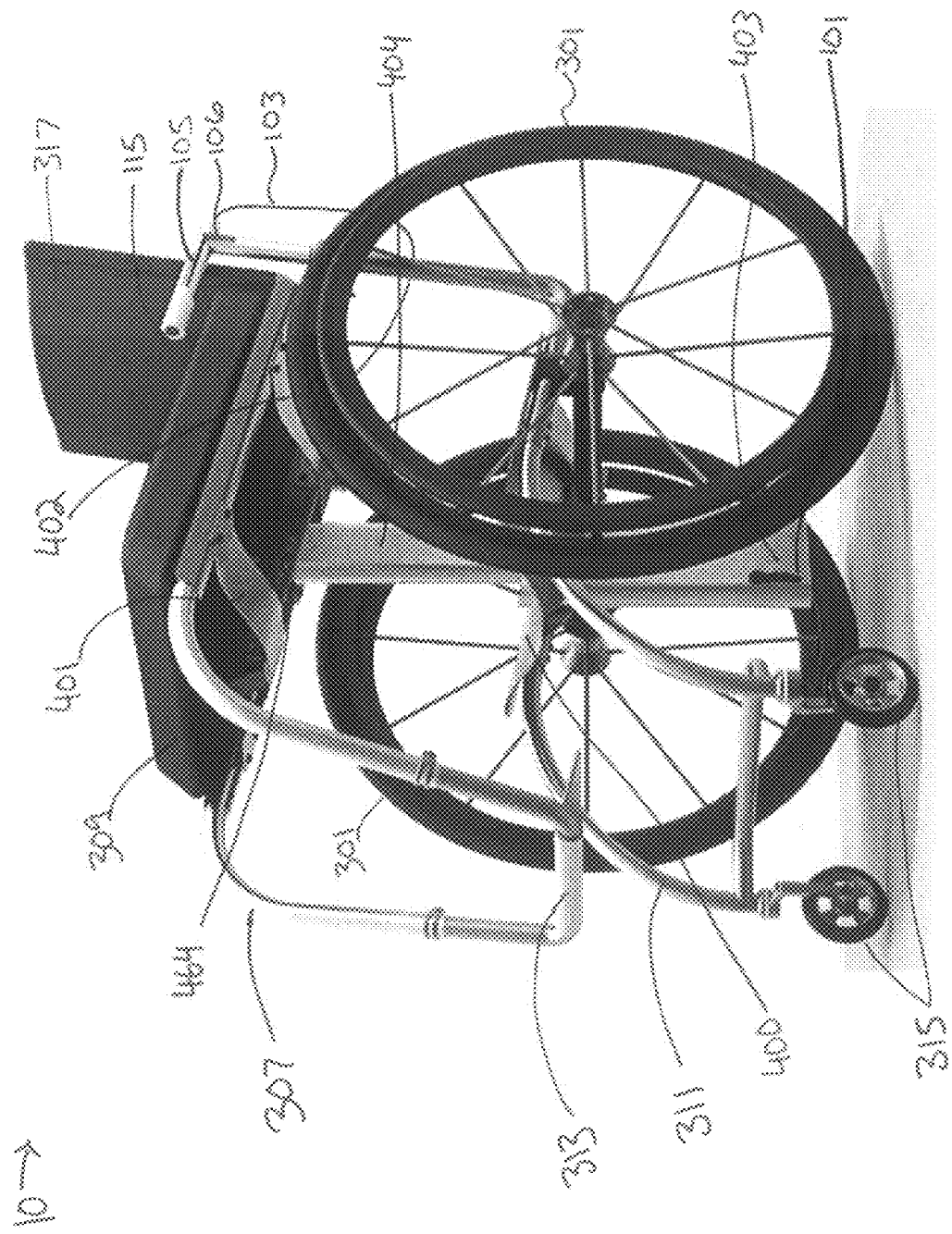
FIGS. 2-3 illustrates various aspects of an exemplary elevating wheelchair in a raised position in accordance with various embodiments.
Figure 3:
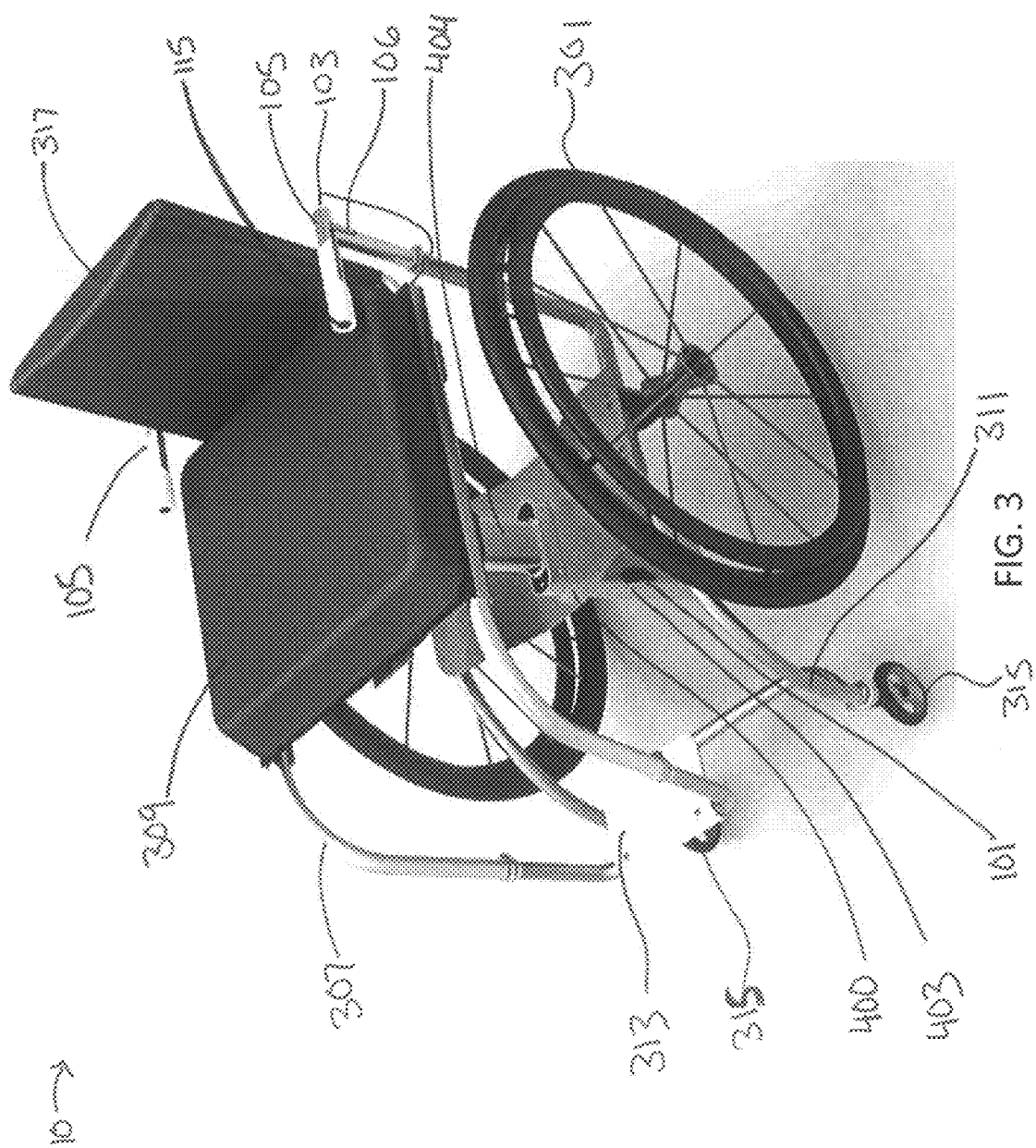

In accordance with principles of the present disclosure, with reference to FIGS. 1-3, in an exemplary embodiment an elevating wheelchair 10 may comprise a gas cylinder 101, an engaging system 103 comprising an engagement interface 115, and assistive push bars 105. Furthermore, in order to operate as a wheelchair, an exemplary elevating wheelchair 10 may also comprise a frame 311, rear wheels 301, front wheels 315, a seat 309, a backrest 317, a footrest 313, and a bar 307 connected to seat 309. Footrest 313 may be integrated into bar 307.

A gas cylinder 101 may elevate the user by lifting the seat 309 of the elevating wheelchair 10 as well as the backrest 317 and bar 307 of the chair. In some embodiments, this elevation lifts users an additional amount above the ground (for example, between about 5 inches (about 12.7 cm) and about 20 inches (about 50.8 cm), and in an exemplary embodiment, about 10 inches (about 25.4 cm), permitting the user to reach items that are usually out of reach and speak with others at or near eye level. In some embodiments, the integrated foot rest of bar 307 is attached to seat 309 and backrest 317 is similarly attached to seat 309 so that seat 309, backrest 317, and bar 307 elevate in unison.

Gas cylinder 101 may be activated using an engaging system 103. In one example embodiment, the engaging system 103 comprises a set of buttons that are incorporated into the assistive push bars 105. In some embodiments, the buttons control cables that activate the gas cylinder 101.

In some embodiments, the gas cylinder 101 (and assistive push bars 105) may be angled slightly toward the front or back of the elevating wheelchair 10 to translate the user's center of gravity forward or aft relative to the axle of rear wheels 301 in response to the seat 309 being raised/lowered. This placement limits the chance that the user may tip over when using the chair and provides added safety and stability. These features will be discussed further with reference to a SCLA apparatus 410 (FIG. 6) and a CSPA apparatus 412 (FIG. 6) below.

In various embodiments, one gas cylinder 101 may be implemented; though any number of gas cylinders 101 suitable to operate the chair may be used. In various embodiments, gas cylinder 101 may be a pneumatic gas spring similar to the gas springs in office chairs. In some embodiments, gas cylinder 101 is different from the gas springs in office chairs, for example, being more robust, thinner, lighter, and able to provide a longer stroke length, for example, in some embodiments, of between about 5 inches (about 12.7 cm) and about 20 inches (about 50.8 cm), or about 10 inches (about 25.4 cm) or more.

In various embodiments, the gas cylinder 101 provides a lift strength equal to ⅔ of the weight of the user (150 pound (68.04 kg) person=100 pound (45.36 kg) total spring lift assist), meaning that the user is responsible for lifting the remaining ⅓ of their weight (150 lb. person=50 pound (about 22.68 kg) lift responsibility), for example, by pressing on the assistive push bars 105. In other exemplary embodiments, one or more gas cylinder 101 provides a combined lift strength of between 20% of the weight of a user and 150% of the weight of a user. The lifting by the user is done similarly to a triceps dip that one would see in a gym, and means that the user must press down on assistive push bars 105, which are attached to the frame 311. In other embodiments, gas cylinder 101 provides a lesser lift strength, or a greater lift strength, or in some embodiments provides a lift strength greater than the weight of the user meaning that the user may be elevated without pressing on the assistive push bars 105.

Thus, in various embodiments, assistive push bars 105 may be mounted to the frame 311 of the chair toward the rear portion of the frame 311 of the chair, though any arrangement adapted to permit the user to push against assistive push bars 105 to help the user lift himself into the air may be implemented. For example, with reference to FIG. 1, assistive push bars 105 are mounted to the frame 311 of the elevating wheelchair 10. The assistive push bars 105 may be mounted toward the back of the frame 311, just above the rear wheels 301, so that they are placed near the user's torso and arms. This placement ensures that the user can easily grab and push or pull on the assistive push bars 105. The assistive push bars 105 may be angled slightly toward the front of the elevating wheelchair 10 in alignment with the angle of the gas cylinder 101 in order to place the user's center of gravity directly above the middle of the elevating wheelchair 10 when elevated. This placement limits the chance that the user may tip over when using the chair and provides added safety and stability. A chair may implement any number of push bars suitable for a given configuration. For example, in some embodiments, two assistive push bars 105 are implemented, one for each hand of the user, though any number of assistive push bars 105 suitable to operate the chair may be used. Moreover, the assistive push bars 105 may each comprise a push bar articulator 106. A push bar articulator 106 may comprise a hinge whereby the assistive push bar 105 may be flipped from extending forward toward the front of the elevating wheelchair 10, to extending aft toward the rear of the elevating wheelchair 10. In this manner, the user may reposition the assistive push bar 105, such as for improved convenience when the elevating wheelchair 10 is raised/lowered, and/or such as to move the assistive push bar 105 out of the user's range of motion such as in the event that the assistive push bar 105 impede a desired movement of the user's arms, torso, and the like.

In some embodiments, assistive push bars 105 further incorporate an engaging system 103, for example, by having an engagement interface 115 mounted thereon. In some embodiments, the engagement interface 115 comprises buttons that actuate cables to control the gas cylinder 101. The engaging system 103 may comprise a cable extending from the gas cylinder 101 and through the frame 311 of the elevating wheelchair 10, and/or extending external to the frame 311 of the elevating wheelchair 10 and connecting to an engagement interface 115 such as a button positioned on at least one of the end, side, top, and/or bottom of the assistive push bar 105 as desired.

In accordance with principles of the present disclosure, moving components of an elevating wheelchair 10 may move between elevated and lowered positions. With reference to FIGS. 1-5, in various embodiments, bar 307, seat 309, and backrest 317 may travel along a fixed path when elevated. For example, various structures discussed further herein may be connected to at least one of bar 307, seat 309, and backrest 317 and may move when the chair is transitioned between down and up configurations.

In various exemplary embodiments, in accordance with principles of the present disclosure, an elevating wheelchair 10 may be utilized to raise and/or lower a user. In order to begin an exemplary lifting process, a user may unlock the gas cylinder 101 from a static position, thereby engaging it. In some embodiments, in order to unlock the gas cylinder 101, the user activates the engagement interface 115, for example by pressing buttons integrated in the assistive push bars 105. After pressing these buttons, the gas cylinder 101 is engaged and allows the seat 309 to elevate due to the pressure of the gas cylinder 101 pushing it upwards (and in some embodiments, also due to an additional force provided by the user pushing against assistive push bars 105). In some embodiments, the lifting process may be stopped at any point within the range of gas cylinder 101, leading to infinitely many stop points. In some embodiments, the user deactivates the engagement interface 115, for example, by releasing the button(s) in order to stop the lifting process. When the user wishes to lower his or her seat 309, the user may similarly unlock and reengage the gas cylinder 101. A user may assist the process by pushing or pulling on the assistive push bars 105, and in some embodiments, can assist the lifting process to fully overcome gravity and aid the gas cylinder 101 in extending or must assist the lowering process to fully overcome the force provided by the gas cylinder 101 and to aid the gas cylinder 101 in retracting.

With reference now to FIGS. 1, 2, 3, and 6, an elevating wheelchair 10 may comprise a cylinder stabilization plate 400, a cylinder outer casing 403 and a cylinder lifting arm 404. The cylinder stabilization plate 400 may be attached to the frame 311 and may hold the cylinder outer casing 403 in fixed mechanical securement to the frame 311. The cylinder outer casing 403 may enclose and support the gas cylinder 101. The gas cylinder 101 may extend and/or retract a cylinder lifting arm 404 extending upwardly from the cylinder outer casing 403 and supporting the seat 309. In this manner, the gas cylinder 101 may be held stably as it extends/retracts with the extension/retraction of the seat 309.

The cylinder stabilization plate 400 may comprise a metal plate having an arc shape. For instance, the cylinder stabilization plate 400 may comprise a downwardly extending arc so that the center of the cylinder stabilization plate 400 is positioned closer to the plane of an axle of the rear wheels 301 than the outer ends of the cylinder stabilization plate 400. In various embodiments, the center of the cylinder stabilization plate 400 may be positioned below the axle of the rear wheels 301. In this manner, space may be provided for a first seat stabilization plate 401 and second seat stabilization plate 402 (discussed further herein) so that the seat 309 may rest directly on the frame 311 when fully refracted. As such, the cylinder stabilization plate 400 may be shaped to enhance the stability of the seat 309 when fully retracted and may further provide rigid support to the gas cylinder 101 disposed within the cylinder outer casing 403 to stably support the seat 309 when fully extended.

The cylinder outer casing 403 may comprise an enclosing structure encasing and supporting the gas cylinder 101. The cylinder outer casing 403 may comprise a rigid structure attached to the cylinder stabilization plate 400. The cylinder outer casing 403 may protect the gas cylinder 101, which may be disposed therein, and may conduct forces exerted on/by the gas cylinder 101 along a load path from the gas cylinder 101 into the cylinder stabilization plate 400.

The cylinder lifting arm 404 may comprise at least one of a rigid tube or rigid rod. The cylinder lifting arm 404 may extend or retract into/out of the cylinder outer casing 403 in response to the actuation of the gas cylinder 101. The cylinder lifting arm 404 may connect to the seat 309 in order to raise/lower the seat 309.

The elevating wheelchair 10 may also comprise one or more seat stabilization plates 401, 402. For instance, the elevating wheelchair 10 may comprise a first seat stabilization plate 401 and a second seat stabilization plate 402. The first seat stabilization plate 401 may be connected to a lower side of the seat 309 and disposed transverse along a front edge of the seat 309, and the second seat stabilization plate 402 may be connected to the lower side of the seat 309 and disposed transverse along a rear edge of the seat 309. Each seat stabilization plate 401, 402 may comprise a metal plate having an arc shape. For instance, each seat stabilization plate 401, 402 may comprise a downwardly extending arc so that the center of the seat stabilization plate 401, 402 is positioned closer to the plane of the axle of the rear wheels 301 than the outer ends of the seat stabilization plate 401, 402. In this manner, space may be provided for a seat stabilization bar 464 extending generally front to back along the center of the bottom of the seat 309 to rest directly on the seat 309, so that the forces exerted on/by the seat 309 during use travel primary along a load path directly into the cylinder lifting arm 404, and at most secondarily along a load path including the seat stabilization plates 401, 402. In further embodiments, seat stabilization plates 401, 402 are disposed in the primary load path between seat 309 and cylinder lifting arm 404. The seat stabilization plates 401, 402 may be shaped to enhance the stability of the seat 309 and may further retain the seat stabilization bar 464 in mechanically fixed position relative to the seat 309.

As mentioned, the elevating wheelchair 10 may comprise a seat stabilization bar 464. The seat stabilization bar 464 may comprise a bar extending front to back along the center of the bottom of the seat 309 and attached to the seat 309 at least one of directly, or via seat stabilization plates 401, 402. The seat stabilization bar 464 may be connected to the cylinder lifting arm 404 as discussed further herein and may provide a portion of the primary load path from the seat 309 into the cylinder lifting arm 404 and may provide the mechanical connection of first seat stabilization plate 401 and the second seat stabilization plate 402 to the cylinder lifting arm 404.

Figure 6:
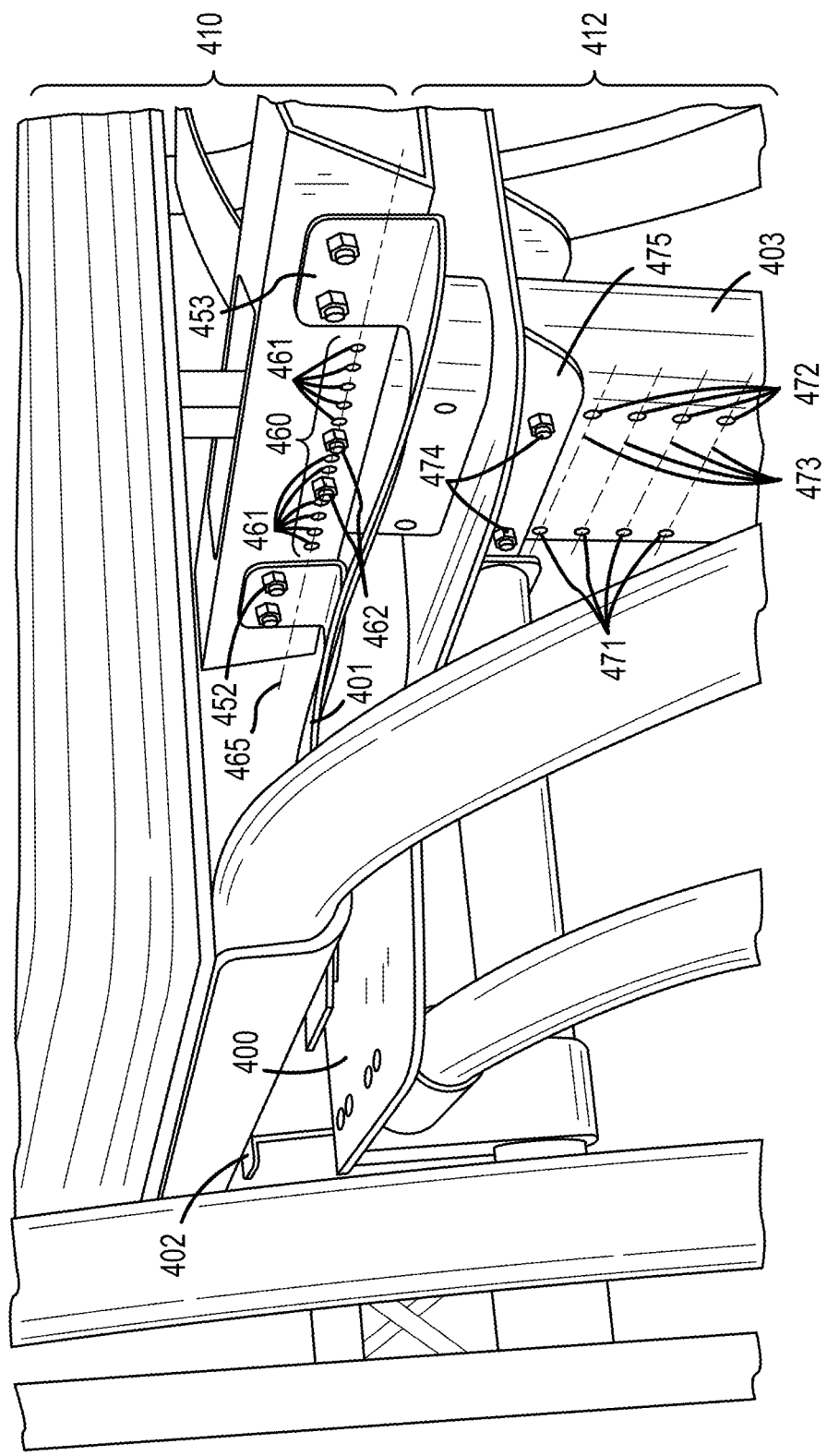
FIG. 6 illustrates a detailed view of an exemplary elevating wheelchair with emphasis on various attachment apparatuses of the wheelchair in accordance with various embodiments.

Directing attention now to FIG. 6, the elevating wheelchair 10 may further comprise a seat-to-cylinder-lifting-arm attachment apparatus ("SCLA apparatus") 410. As discussed above, the seat stabilization bar 464 may be connected to the seat 309 via the seat stabilization plates 401, 402 and also to the cylinder lifting arm 404. Now, attention is directed to various specific aspects of this connection. The SCLA apparatus 410 may comprise a first seat stabilization plate attachment bracket 452 and a second seat stabilization plate attachment bracket 453. The first seat stabilization plate attachment bracket 452 may comprise a bracket connected to and/or integrally formed with the first seat stabilization plate 401. The second seat stabilization plate attachment bracket 453 may comprise a bracket connected to and/or integrally formed with the second seat stabilization plate 402. Each of the first seat stabilization plate attachment bracket 452 and second seat stabilization plate attachment bracket 453 may comprise a flange extending from the corresponding seat stabilization plate 401, 402 and arranged to connect to the seat stabilization bar 464, whereby the seat stabilization bar 464 may be secured in fixed mechanical position relative to each seat stabilization plate 401. In various embodiments, a first seat stabilization plate attachment bracket 452 is disposed toward the front edge of the seat 309 (e.g., forward of the center of the seat stabilization bar 464), and a second seat stabilization plate attachment bracket 463 is disposed toward the rear edge of the seat 309 (e.g., aft of the center of the seat stabilization bar 464). In this manner, the combination of the seat stabilization plate 401 and the perpendicularly disposed seat stabilization bar 464, (joined in fixed mechanical securement by the first seat stabilization plate attachment bracket 452 and second seat stabilization plate attachment bracket 453) may securely retain the seat 309 in mechanical connection to the cylinder lifting arm 404.

The SCLA apparatus 410 may further comprise a cylinder lifting arm attachment apparatus 460. The cylinder lifting arm attachment apparatus 460 may effectuate the attachment of the cylinder lifting arm 404 to the seat stabilization bar 464. The cylinder lifting arm attachment apparatus 460 may be arranged to permit the adjustment of the seat stabilization bar 464 so that the seat stabilization bar 464 (and thus the seat 309) may be adjusted forward and aft relative to the cylinder lifting arm 404. The cylinder lifting arm attachment apparatus 460 may comprise attachment apertures 461, disposed along an aperture axis 465, and configured to accept fasteners 462. Fasteners 462 may extend through selected attachment apertures 461 and through the cylinder lifting arm 404, thereby holding the cylinder lifting arm 404 and the seat stabilization bar 464 in fixed mechanical securement.

Finally, the elevating wheelchair 10 may comprise a cylinder-to-stabilization-plate attachment apparatus ("CSPA apparatus") 412. The CSPA apparatus 412 may effectuate the interconnection of the cylinder outer casing 403 to the cylinder stabilization plate 400. In this manner, the CSPA apparatus 412 may retain the cylinder outer casing 403 in fixed mechanical securement to the frame 311. Moreover, the CSPA apparatus 412 may be adjusted upward and downward relative to the frame 311. Thus, by adjusting the CSPA apparatus 412 and the SCLA apparatus 410, the position of a seat travel path 409 (FIGS. 4-5) of the seat 309 as it extends and retracts may be adjusted relative to the plane of the axles of the rear wheels 301. The CSPA apparatus 412 may comprise forward attachment apertures 472, aft attachment apertures 471, aperture pair axes 473, fasteners 474, and cylinder stabilization plate attachment bracket 475.

Forward attachment apertures 472 may comprise a series of apertures spaced along the cylinder outer casing 403 and positioned forward a centerline of the cylinder outer casing 403. The aft attachment apertures 471 may comprise a series of apertures spaced along the cylinder outer casing 403 and positioned aft of a centerline of the cylinder outer casing 403. In various embodiments, each forward attachment aperture 472 aligns with at least one aft attachment aperture 471 along an aperture pair axis 473. As such, aperture pair axes 473 may comprise axes running forward to aft crossing a centerline of the cylinder outer casing 403. Each aperture pair axis 473 may have an angle relative to the surface on which the elevating wheelchair 10 is sitting comprising at least a portion of an elevation angle 406 (FIG. 4-5) of the elevating wheelchair 10. As such, by inserting fasteners 474 through a forward attachment apertures 472 and an aft attachment aperture 471 associated with an aperture pair axis 473, each fastener 474 also inserted through the cylinder stabilization plate attachment bracket 475, the relative angle of the cylinder outer casing 403 versus the cylinder stabilization plate attachment bracket 475 (and thus versus the surface on which the elevating wheelchair 10 is sitting) may be chosen according to the angle of the aperture pair axis 473. As such, at least a portion of the elevation angle 406 (FIG. 4-5) may be chosen.

Figure 4:
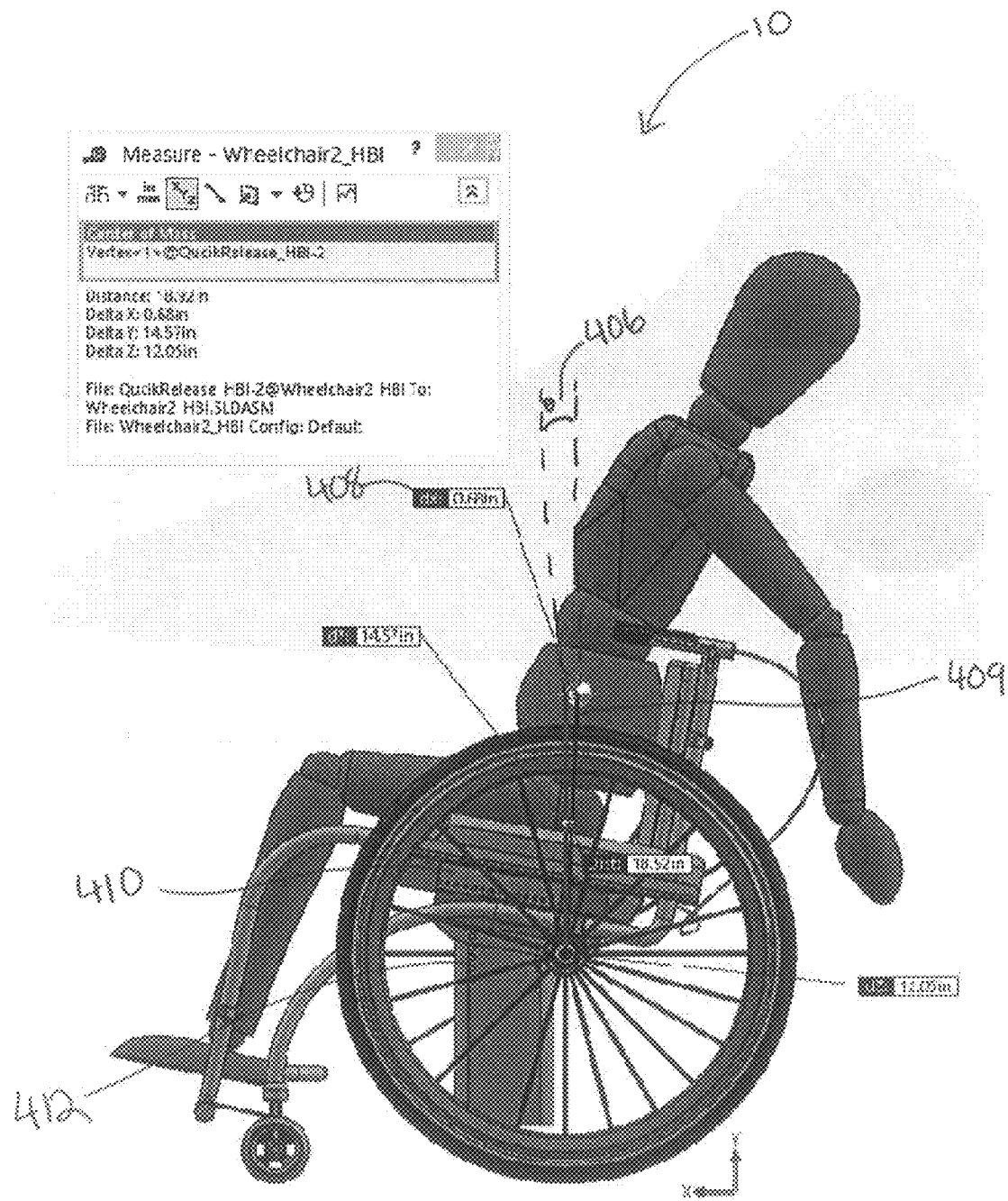
FIG. 4 illustrates a side view of an exemplary elevating wheelchair in a lowered position with emphasis on the elevation angle of the wheelchair in accordance with various embodiments.
Figure 5:
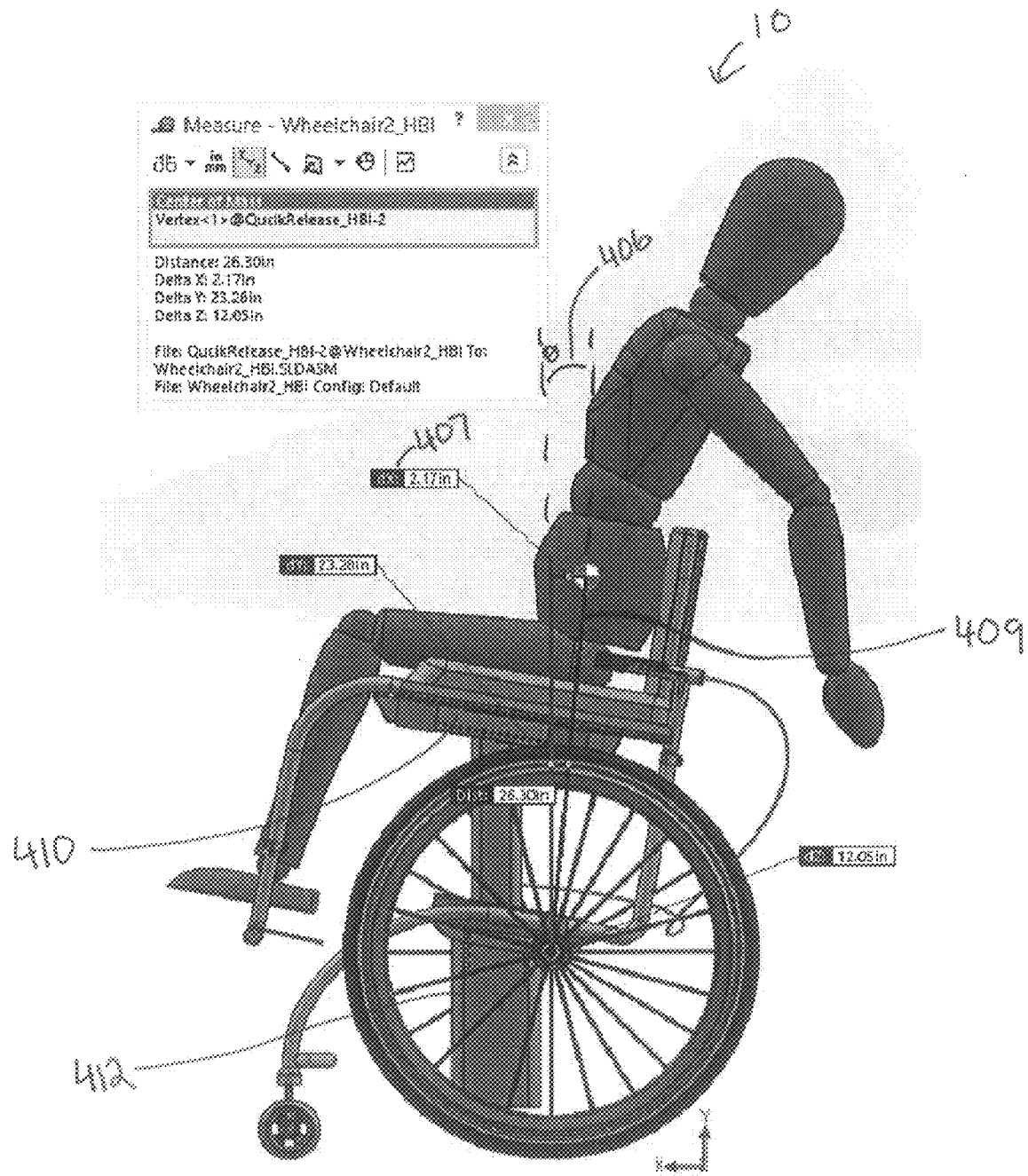
FIG. 5 illustrates a side view of an exemplary elevating wheelchair in a raised position with emphasis on an example of an elevation angle of the wheelchair in accordance with various embodiments.

With reference now to FIGS. 4-5, an elevating wheelchair 10 may have an elevation angle 406. The elevation angle 406 may comprise an angle of the seat travel path 409 relative to the normal axis of the surface on which the elevating wheelchair 10 is sitting. The elevation angle 406 may impel a corresponding translation of the seat 309 forward or aft relative to the main wheel axles as the seat 309 is elevated and lowered. For instance, the elevating wheelchair 10 may comprise an elevated seat axle offset 407 comprising an X-axis (e.g., horizontal component relative to the Z-axis origin, wherein the Z-axis origin extends through both main wheel axles) distance between a fixed position on a user's body such as the user's center of gravity and the axles of the main wheels. The elevating wheelchair 10 may further comprise a lowered seat axle offset 408 comprising an X-axis distance between the same fixed position on the user's body and the axles of the main wheels. In this manner, the seat 309 may travel along a seat travel path 409 having an X-axis component bounded by the elevated seat axle offset 407 at one end and the lowered seat axle offset 408 at the other end.

In various embodiments, the elevation angle 406 may comprise an angle of 15 degrees. In further embodiments, the elevation angle 406 may comprise an angle of −30 degrees to 30 degrees or may comprise any desired angle.

Moreover, the lowered seat axle offset 408 may comprise an offset of about 0.68 inches (about 1.72 cm) behind the axles of the main wheels and the elevated seat axle offset 407 may comprise an offset of about 2.17 inches (about 5.51 inches) behind the axles of the main wheels. In various embodiments, the fixed point does not comprise the user's center of gravity, but comprises a point in space about 14.57 inches (about 37.01 cm) above the axle of the main wheels when the seat 309 is fully lowered, and a point in space about 23.28 inches (about 59.13 cm) above the axle of the main wheels when the seat 309 is raised about 7.38 inches (about 18.75 cm). In various embodiments, the seat 309 being raised about 7.38 inches (about 18.75 cm) comprises the distance between fully raised and fully lowered positions. Because the seat 309 travels along a path having an angle relative to the Y-axis, the actual distance of travel of the seat 309 along the seat travel path 409 may comprise about 8.71 inches (about 22.12 cm).

Exemplary elevating wheelchairs 10 configured in accordance with principles of the present disclosure may be manufactured from various materials. In various embodiments, the frame 311 of the chair is made of aluminum that has been bent and welded (or formed in another suitable manner) so that it can accommodate the mounting equipment for the rear wheels 301, caster wheels, assistive push bars 105, and gas cylinder 101. These mounting components may be made from cast aluminum or other suitable materials and are made to accommodate each of these parts.

Alternatively, components of an elevating wheelchair 10 may comprise titanium or stainless steel, though they may alternatively comprise numerous other materials configured to provide support, such as, for example, metal, plastic, composite, ceramic, a KEVLAR (para-aramid fiber) material such as a para-aramid fiber composite material, a DYNEMA (ultra high molecular weight polyethylene) material such as an ultra-high molecular weight polyethylene composite material, an aramid fiber material such as an aramid fiber composite material, alloy, glass, binder, epoxy, polyester, acrylic, or any material or combination of materials having a desired strength, stiffness, or flexibility sufficient to maintain resiliency during use. In various embodiments, various portions of an elevating wheelchair 10 as disclosed herein are made of different materials or combinations of materials, and/or may comprise coatings. For example, rear wheels 301 may be coated with a high friction material.

In various embodiments, components of an elevating wheelchair 10 may comprise multiple materials, or any material configuration suitable to enhance or reinforce the resiliency and/or support of the system when subjected to wear in an operating environment or to satisfy other desired electromagnetic, chemical, physical, or biological properties. Furthermore, components of an elevating wheelchair 10 may comprise materials with grain structures or with no grain structures. Components of an elevating wheelchair 10 may comprise materials with similar grain structures, or with differing grain structures or grain direction or with similar grain structures or grain direction or any grain structure or direction suitable for achieving desired properties in the system; for example, resiliency under repetitive loads, vibration, shock, and temperature changes.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled", "coupling" or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. An elevating wheelchair comprising:
a wheelchair frame;
a cylinder stabilization plate mechanically directly attached to the wheelchair frame;
a gas cylinder disposed within a cylinder outer casing directly attached to the cylinder stabilization plate; and
a cylinder lifting arm configured to be at least one of extended and retracted by the gas cylinder;
wherein the cylinder stabilization plate comprises a metal plate having an arc shape comprising a downwardly extending arc having a center positioned closer to an axle of a rear wheel of the elevating wheelchair than are outer ends of the downwardly extending arc.

2. The elevating wheelchair of claim 1,
wherein the cylinder stabilization plate is joined to the cylinder outer casing by a cylinder-to-stabilization-plate attachment apparatus ("CSPA apparatus").

3. The elevating wheelchair of claim 2, the CSPA apparatus comprising:
a plurality of forward attachment apertures spaced along the cylinder outer casing and positioned forward of a centerline of the cylinder outer casing; and a plurality of aft attachment apertures spaced along the cylinder outer casing and positioned aft of the centerline of the cylinder outer casing,
wherein each forward attachment aperture aligns with an aft attachment aperture along an aperture pair axis, and
wherein each attachment pair axis has an angle comprising at least a portion of an elevation angle of the elevating wheelchair.

4. The CSPA apparatus of claim 3 further comprising:
a cylinder stabilization plate attachment bracket mechanically attached to the cylinder stabilization plate and configured to receive fasteners through at least one forward attachment aperture and at least one aft attachment aperture, whereby the cylinder stabilization plate attachment bracket is connectable in fixed mechanical securement to the cylinder outer casing.

5. The elevating wheelchair of claim 1,
wherein the cylinder lifting arm comprises a rigid tube configured to at least one of extend and retract from the cylinder outer casing in response to a user actuating the gas cylinder.

6. The elevating wheelchair according to claim 1, further comprising:
an assistive push bar comprising a push bar articulator comprising a hinge whereby the assistive push bar may be repositioned; and
an engaging system comprising an engagement interface disposed on the assistive push bar and controllable by a user whereby the gas cylinder may be actuated.

7. The elevating wheelchair of claim 1, further comprising:
a first seat stabilization plate mechanically connected to a seat; and
a seat-to-cylinder-lifting-arm attachment apparatus ("SCLA apparatus") mechanically joining the cylinder lifting arm to the first seat stabilization plate.

8. The elevating wheelchair of claim 7, further comprising:
a second seat stabilization plate mechanically attached to the SCLA apparatus,
wherein the SCLA apparatus mechanically joins the cylinder lifting arm to the first seat stabilization plate and the second seat stabilization plate.

9. The elevating wheelchair of claim 8,
wherein the first seat stabilization plate and the second seat stabilization plate each comprise a metal plate having an arc shape comprising a downwardly extending arc having a center positioned closer to an axle of a rear wheel of the elevating wheelchair than are outer ends of the downwardly extending arc.

10. The elevating wheelchair of claim 9,
further comprising a seat stabilization bar extending front to back along the center of a bottom side of the seat and attached to the seat,
wherein the seat stabilization bar is mechanically connected between the cylinder lifting arm and the first seat stabilization plate and the second seat stabilization plate.

11. The elevating wheelchair of claim 8, the SCLA apparatus comprising:
a first seat stabilization plate attachment bracket comprising a flange extending from the first seat stabilization plate and arranged to connect to a seat stabilization bar forward of a center of the seat stabilization bar; and
a second seat stabilization plate attachment bracket comprising a flange extending from the second seat stabilization plate and arranged to connect to the seat stabilization bar aft of the center of the seat stabilization bar.

12. The elevating wheelchair of claim 11, the SCLA apparatus further comprising a cylinder lifting arm attachment apparatus joining the cylinder lifting arm to the seat stabilization bar.

13. The elevating wheelchair of claim 12, wherein the cylinder lifting arm attachment apparatus comprises attachment apertures disposed along an aperture axis and configured to accept fasteners insertable through the cylinder lifting arm and into the attachment apertures.

14. An elevating wheelchair comprising:
a wheelchair frame;
a cylinder stabilization plate mechanically directly attached to the wheelchair frame and a cylinder outer casing;
an assistive push bar mechanically directly attached to the wheelchair frame and comprising a push bar articulator comprising a hinge whereby the assistive push bar may be repositioned;
an engaging system comprising an engagement interface disposed on the assistive push bar and controllable by a user whereby a gas cylinder may be actuated; and
a seat configured to be at least of raised and lowered by the gas cylinder along a seat travel path;
wherein the cylinder stabilization plate comprises a metal plate having an arc shape comprising a downwardly extending arc having a center positioned closer to an axle of a rear wheel of the elevating wheelchair than are outer ends of the downwardly extending arc.

15. The elevating wheelchair of claim 14,
wherein the cylinder stabilization plate is joined to the cylinder outer casing by a cylinder-to-stabilization-plate attachment apparatus ("CSPA apparatus").

16. The elevating wheelchair of claim 15, the CSPA apparatus comprising:
a plurality of forward attachment apertures spaced along the cylinder outer casing and positioned forward of a centerline of the cylinder outer casing; and
a plurality of aft attachment apertures spaced along the cylinder outer casing and positioned aft of the centerline of the cylinder outer casing,
wherein each forward attachment aperture aligns with an aft attachment aperture along an aperture pair axis, and
wherein each attachment pair axis has an angle comprising at least a portion of an elevation angle of the elevating wheelchair.

17. The elevating wheelchair of claim 14, further comprising:
a first seat stabilization plate mechanically connected to the seat;
a seat-to-cylinder-lifting-arm attachment apparatus ("SCLA apparatus") mechanically joining a cylinder lifting arm to the first seat stabilization plate;
a second seat stabilization plate mechanically attached to the SCLA apparatus,
wherein the SCLA apparatus mechanically joins the cylinder lifting arm to the first seat stabilization plate and the second seat stabilization plate; the SCLA apparatus comprising:
a first seat stabilization plate attachment bracket comprising a flange extending from the first seat stabilization plate and arranged to connect to a seat stabilization bar forward of a center of the seat stabilization bar; and
a second seat stabilization plate attachment bracket comprising a flange extending from the second seat stabilization plate and arranged to connect to the seat stabilization bar aft of the center of the seat stabilization bar.

* * * * *